UNITED STATES PATENT OFFICE.

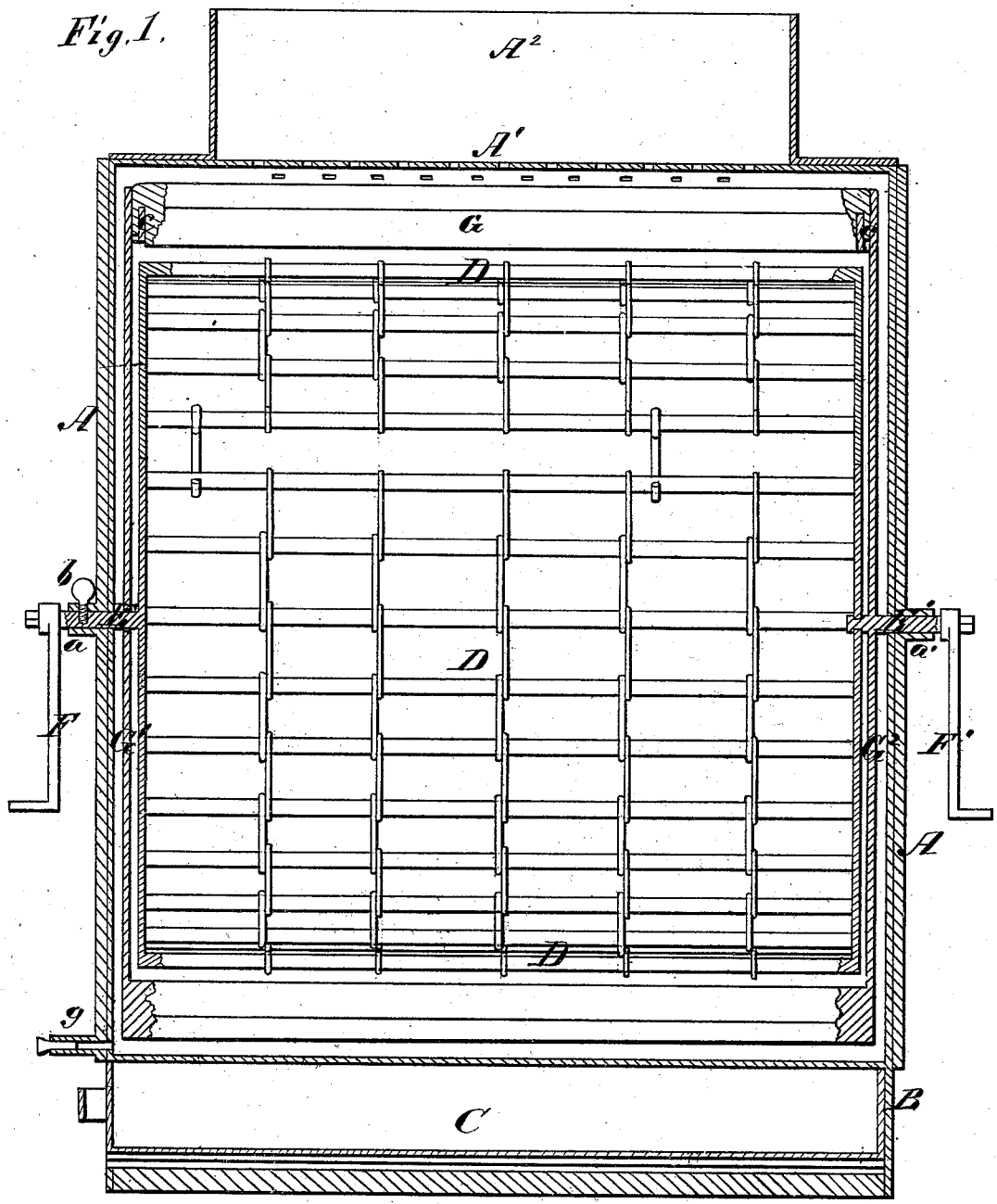

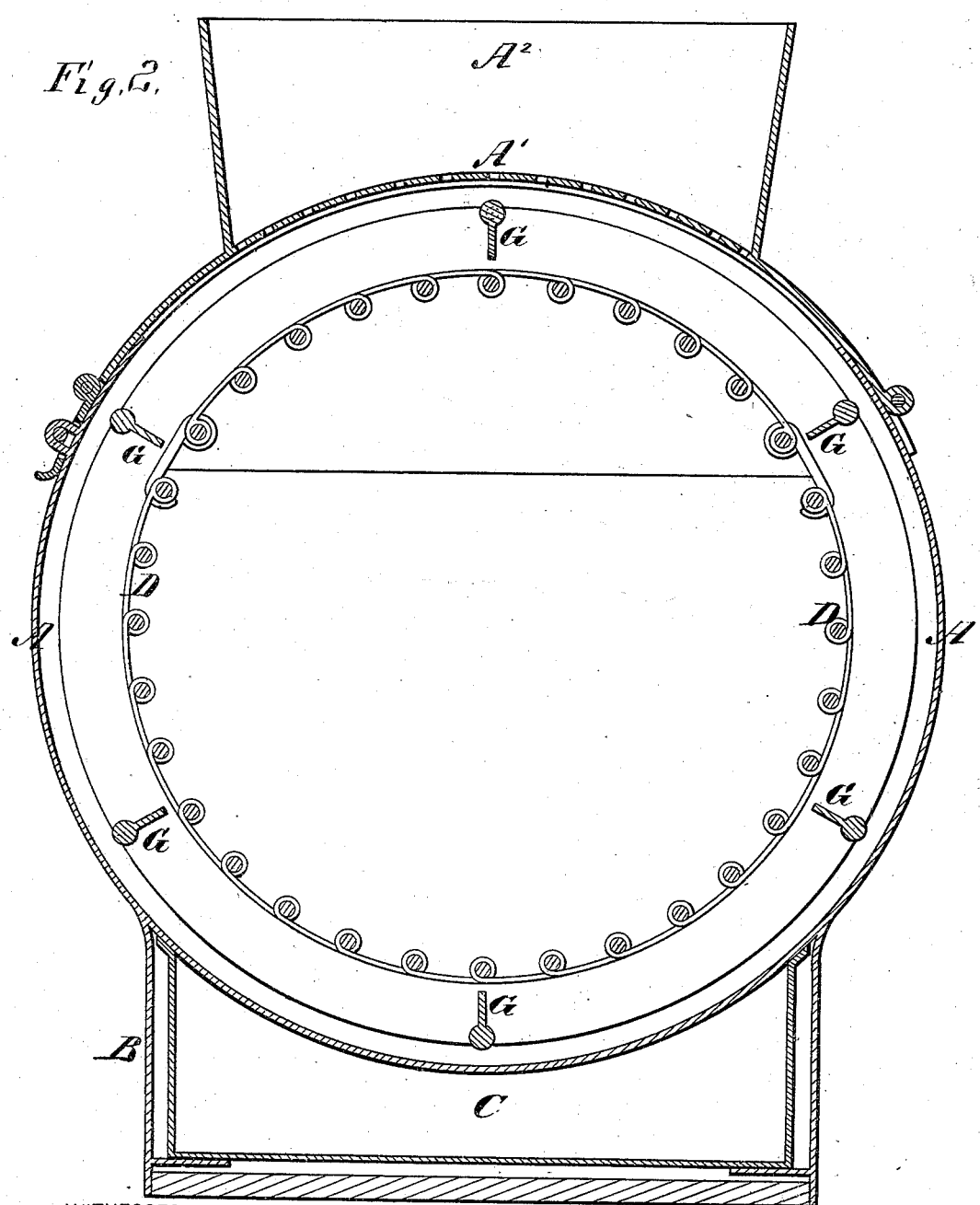

HENRY D. STARR, OF TEXANA, TEXAS, ASSIGNOR OF ONE-HALF HIS RIGHT TO RICE S. FLOURNOY, OF SAME PLACE.

IMPROVEMENT IN DISH-WASHING MACHINES.

Specification forming part of Letters Patent No. 147,996, dated February 24, 1874; application filed November 22, 1873.

*To all whom it may concern:*

Be it known that I, HENRY DANL. STARR, of Texana, in the county of Jackson and State of Texas, have invented a new and valuable Improvement in Dish-Washing and Clothes-Washing Machine; and I do hereby declare that the following is a full, clear, and exact description of the construction and operation of the same, reference being had to the annexed drawings making a part of this specification, and to the letters and figures of reference marked thereon.

Figure 1 of the drawings is a representation of transverse section of my washer. Fig. 2 is a longitudinal section of the same.

This invention has relation to machines which are especially designed for washing dishes; and it consists in a tray with a perforated bottom, and in the construction and arrangement of the parts, as will be hereinafter explained, whereby dishes put on the blades or shelves, and revolved around the grated cylinder in water, can be cleansed with great facility, as will be hereinafter explained.

The following is a description of my invention:

In the annexed drawings, A represents a cylindrical drum, which is mounted upon a box, B, containing a drawer, C. This drum has a large opening through its upper side, which is provided with a perforated hinged cover, $A^1$, from which rises a tray, $A^2$. Inside of the drum A is a grated cylinder, D, which is composed of two circular heads, united by longitudinal and circular wires, forming large meshes, for allowing a free circulation of water through them. This cylinder has a portion of its grating hinged, for the purpose of allowing access to its interior when the machine is used for washing clothes. E E' are two gudgeons, which pass through long tubular bearings $a$ $a'$, applied centrally to the heads of the drum A, and receive on their ends cranks F F'. The gudgeon E is rigidly connected to one of the heads of the cylinder D, so that this cylinder can be rotated by turning the crank F when a screw, $b$, is removed from its gudgeon. The gudgeon E' affords a bearing for the opposite end of the cylinder D, and allows the latter to turn freely around it. G G represent blades or carriers for dishes, which are secured to two heads, $G^1$ $G^2$, and arranged between the grated cylinder and the drum A, at suitable distances apart, and in planes radiating from the axis of the said cylinder. One or more of these blades may be connected to their heads by means of hooks and eyes $c$ $c$, which will allow such blades to be removed, when necessary. The head $G^1$ is allowed to turn freely around the gudgeon E, and the head $G^2$ is permanently secured to the gudgeon E', so that by turning the crank F' the heads $G^1$ $G^2$, with their blades, can be revolved independently of the grated cylinder.

The cover $A^1$ being raised, the dishes to be washed are laid one upon another between the blades G, wire coils being applied between the dishes to keep them separated. Thus arranged, the dishes will be confined between the grated cylinder and drum A and between the blades G. The cover $A^1$ is then shut and fastened, and hot water is poured into the drum through the perforations at the bottom of the tray $A^2$, after which the blades are rotated, carrying around with them the plates or dishes, and cleansing them. The hot water can be drawn off through the outlet-cock $g$, and cold water introduced into the drum for the purpose of rinsing the dishes. During this operation the screw $b$ prevents the grated cylinder from rotating.

For the purpose of washing fabrics, the screw $b$ is removed, to allow both the cylinder and the blades to be rotated or oscillated independently of each other. The fabrics, in this operation, are put into the grated cylinder, and tossed about violently by rotating or oscillating it.

What I claim as new, and desire to secure by Letters Patent, is—

1. In combination with the revolving dish-holder D G, the tray $A^2$, having a perforated bottom, $A^1$, for the purpose mentioned.

2. The combination of the grated cylinder D and the revolving blades G, arranged inside of the case A, with the tray $A^2$, substantially as shown and specified.

In testimony that I claim the above I have hereunto subscribed my name in the presence of two witnesses.

HENRY DANIEL STARR.

Witnesses:
W. H. COLEMAN,
J. M. BRONAUGH.